United States Patent [19]

Bitoh

[11] Patent Number: 4,804,825
[45] Date of Patent: Feb. 14, 1989

[54] I C CARD SYSTEM
[75] Inventor: Hiroyasu Bitoh, Tokyo, Japan
[73] Assignee: Casio Computer Co., Ltd., Tokyo, Japan
[21] Appl. No.: 62,505
[22] Filed: Jun. 11, 1987
[30] Foreign Application Priority Data Jun. 17, 1986 [JP] Japan .................................. 61-140635
Jun. 17, 1986 [JP] Japan .............................. 61-92037[U]
Jun. 19, 1986 [JP] Japan .................................. 61-143720

[51] Int. Cl.$^4$ ............................................. G06K 5/00
[52] U.S. Cl. ..................................... 235/380; 235/492
[58] Field of Search ................................ 235/380, 492

[56] References Cited

U.S. PATENT DOCUMENTS 4,650,975 3/1987 Kitchener ............................. 235/375
4,755,660 7/1988 Nakano ................................. 235/380

Primary Examiner—Harold I. Pitts
Attorney, Agent, or Firm—Frishauf, Holtz, Goodman & Woodward

[57] ABSTRACT

An IC card system in which either an on-line transaction or an off-line transaction can be made by using an IC card. The IC card contains a memory for storing the data about every transaction made by using the IC card. Whenever an on-line transaction is made, the data about every off-line transaction previously made is read from the memory and then transferred to a host computer. Further, whenever the number of continuously performed off-line transactions becomes greater than a predetermined value, no further off-line transactions will be prohibited.

10 Claims, 9 Drawing Sheets

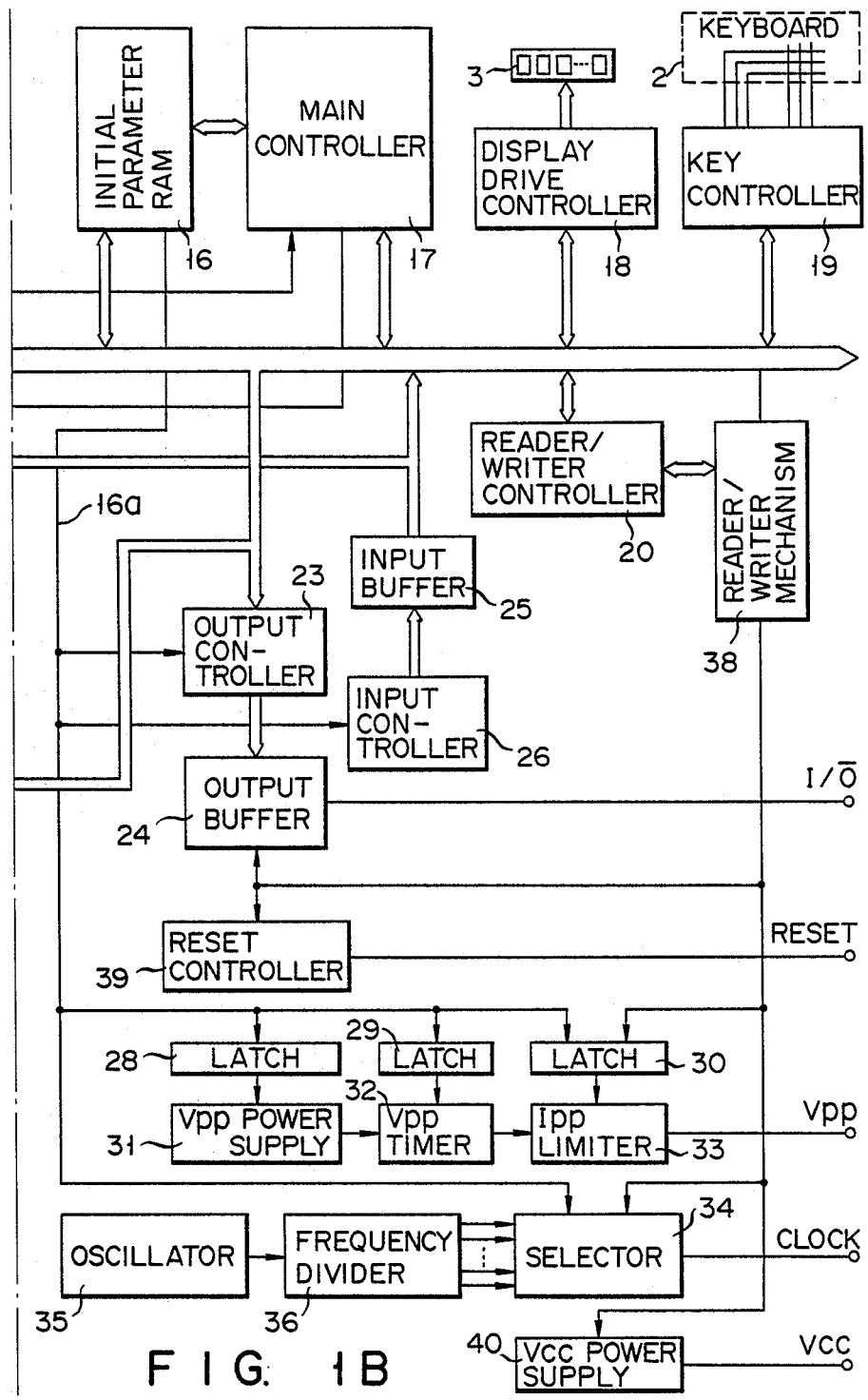
F I G. 1B

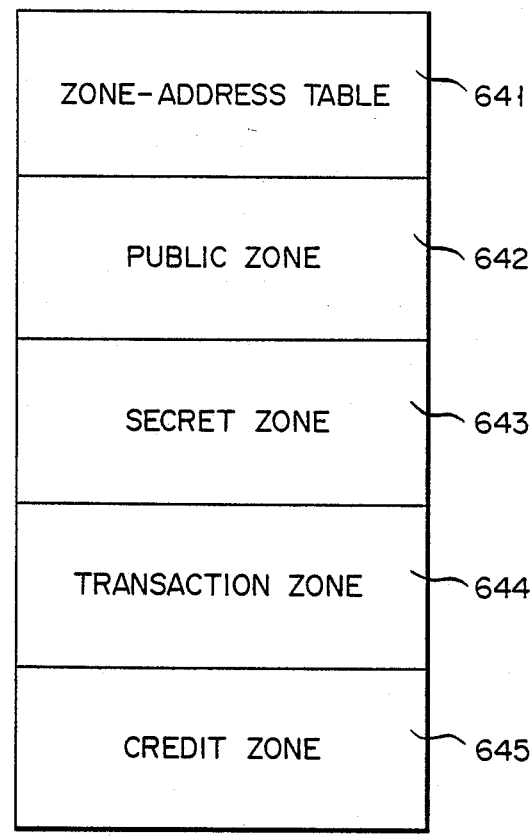
F I G. 3

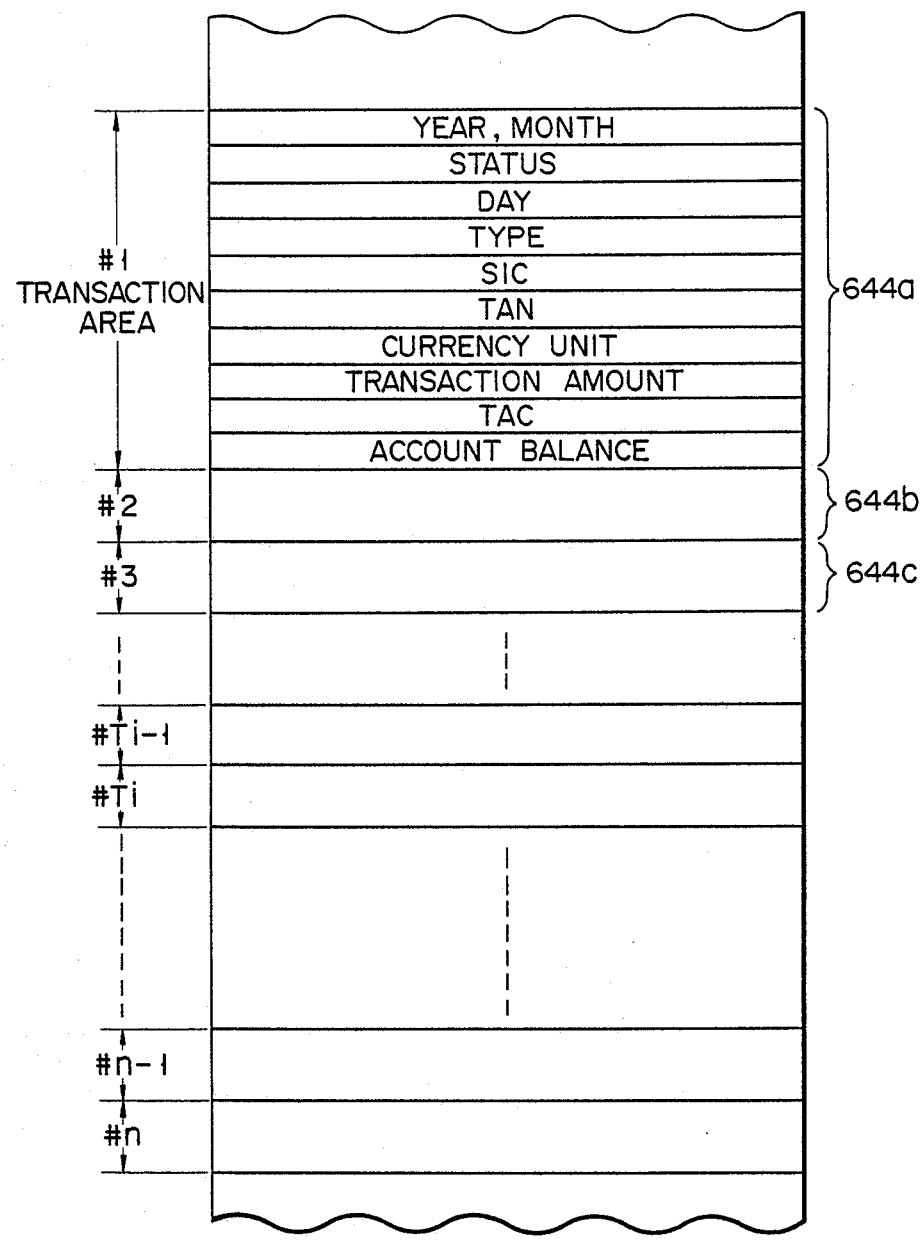
F I G. 4

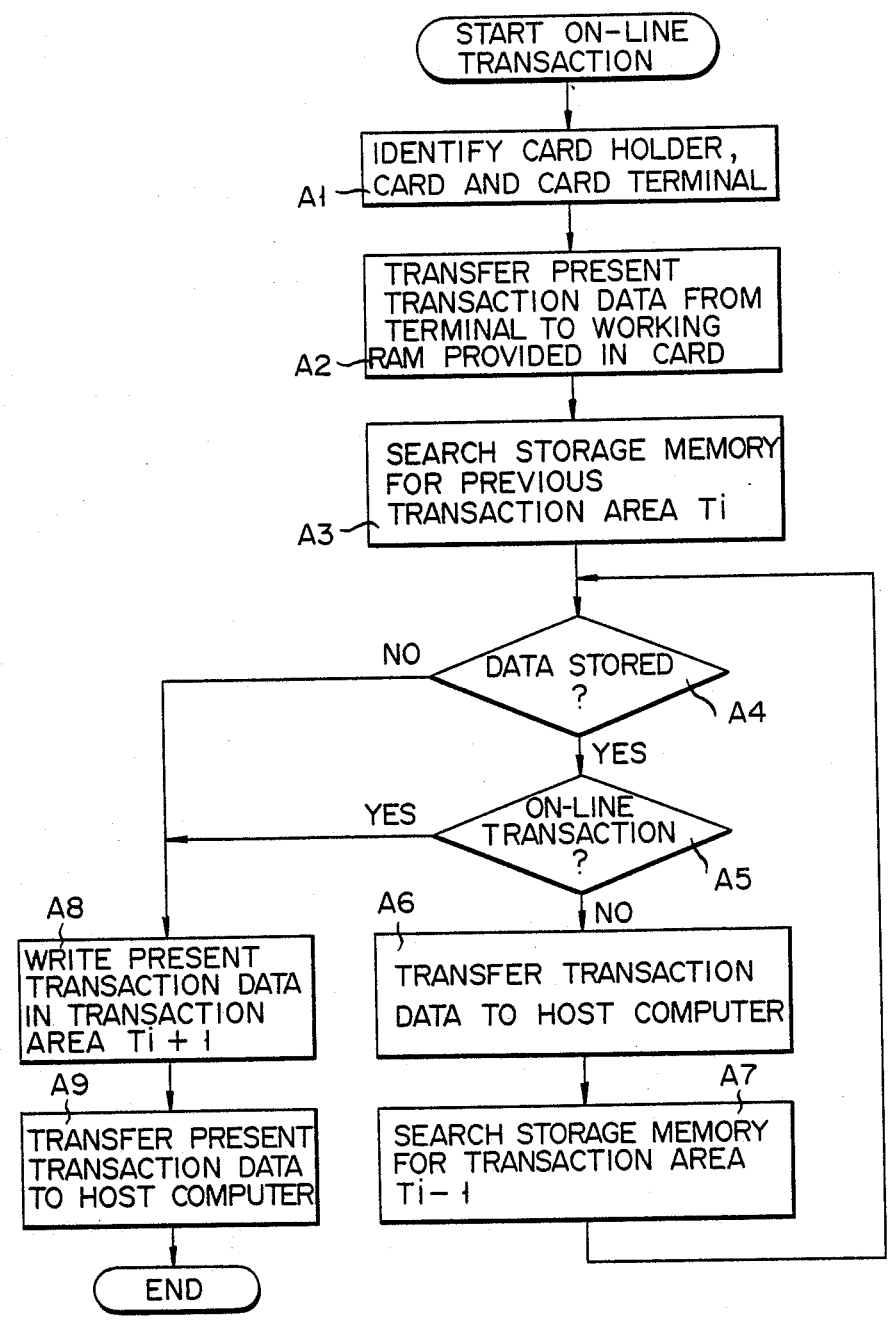
F I G. 5

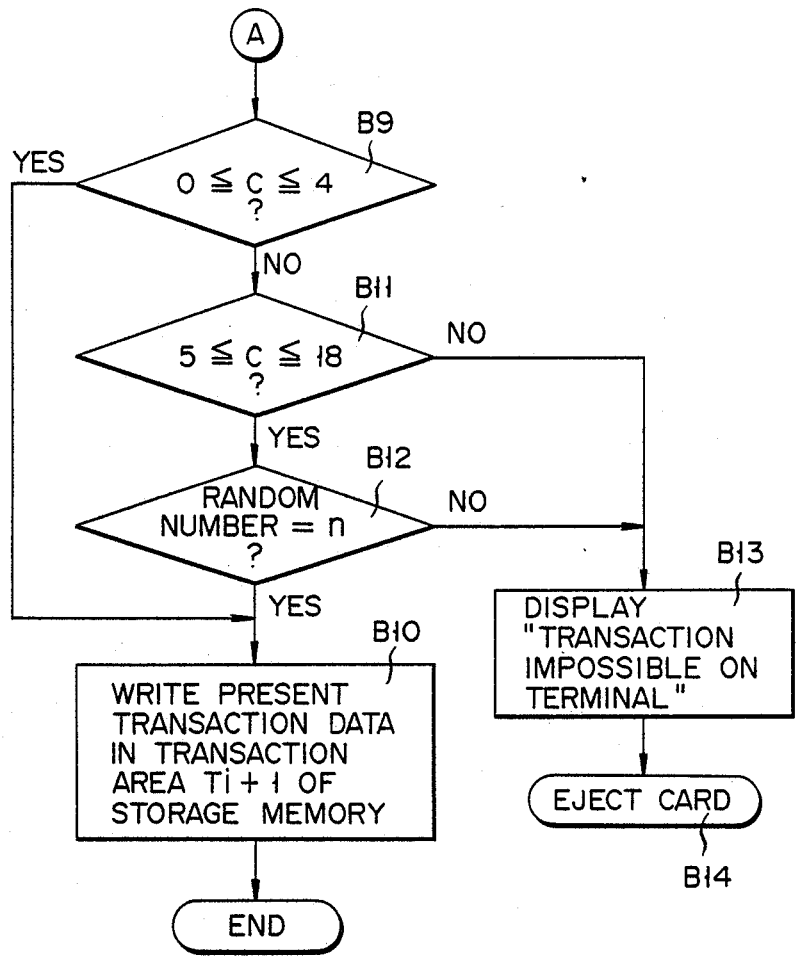
F I G. 6B

I C CARD SYSTEM

BACKGROUND OF THE INVENTION

The present invention relates to an IC card system which enables users to make off-line transactions quickly and which increases the security of transactions.

DESCRIPTION OF THE PRIOR ART

Recent times have come to be known as the "cashless era." Now, people can buy goods without paying in cash, by using cards issued by credit companies or the like.

Among the cards used at present are: plastic cards, embossed cards, and magnetic-stripe cards. These cards are so simple in structure that they can easily be forged. And fraudulent use of forged cards has become a great problem.

In order to solve this problem, a new type of a card, generally known as the "IC card" has been invented. The IC card contains an IC circuit having a memory storing the personal identification number of the authenticated holder of the card.

The personal identification number cannot easily be read from the IC card. An IC card system, which is a combination of the IC card and a terminal device, has also been invented.

In the IC card system, the IC card can be used in two modes, that is, on-line mode and off-line mode. In the on-line mode, the card is inserted in a card terminal coupled to the host computer of a credit company, a bank, or the like. In the off-line mode, the IC card is inserted in a card terminal installed in a shop and not connected to such a host computer.

When the IC card is used in the off-line mode, all data about every transaction made by using the card is stored in the memory contained in the IC card. The holder of the card takes the IC card to the credit company, the bank, or the like, for example, one a month, and the transaction data is read out from the IC card and used to clear off his or her debits. The collection of the off-line transaction data is much delayed in comparison with that of the on-line transaction data. Here arises a problem.

The balance, the personal credit data, etc. are not rewritten until the clearing is made in the bank, the credit company, or the like. As long as the off-line transaction data remains in the memory of the IC card, the balance, the personal credit data, etc., may be different from the actual value and may be incorrect. This causes the credit company, the bank and the like many problems. In addition, since the balance, the credit data and other data are remain unrewritten until the clearing is made, the fraudulent use of the IC card, if any, cannot be detected before the clearing. Hence, the security of the IC card cannot be guaranteed.

In order to reduce the possibility of such fraudulent off-line use of the IC card, the amount of each off-line transaction is limited in the conventional IC card system. This method works as long as the IC card is used only in one shop. Since the IC card can be used in many other shops, the user can buy goods the total price of which well surpasses the limited amount. If the IC card is illegally used in off-line mode in many shops, the damage will be very great.

To ensure security against illegal off-line transactions in different shops, the number of consecutive off-line transactions, which can be made during a predetermined period of time, is limited. This method cannot be as effective as expected. Once the limited number of consecutive off-line transaction has been known, it is possible that the IC card is fraudulently used a number of times less than the limited number. After all, the security of the off-line transactions in the IC card system cannot be guaranteed. To make matters worse, this method causes the authenticated holders of the IC cards a specific trouble. Unless each holder records every off-line transaction he or she makes by using the IC card, he or she cannot know how many times the IC card furthermore. So it does happen that the authenticated holder is much annoyed to find his or her IC card is no longer usable after he or she has selected goods to buy. In view of this, the conventional IC card system cannot be said to be satisfactory, as far as offline transactions are concerned.

SUMMARY OF THE INVENTION

It is accordingly one object of the present invention to provide an IC card system which can collect off-line transaction data quickly, thus updating the various items of data stored in each IC card, whereby to increase the security of the IC card.

Another object of the invention is to provide an IC card system, wherein the number of off-line transactions which can be made by using each IC card for a specified period of time is altered within a predetermined range, thereby to increase the security against fraudulent use of the IC card.

Yet another object of the present invention is to provide an IC card system, wherein the holder of an IC card can be informed of the number of off-line transactions he or she can make furthermore by using his or her IC card, thereby to cause the holder no troubles.

According to the present invention, there is provided an IC card system which comprises IC card means containing an IC chip including a memory having memory areas for storing transaction data about transactions made by using the IC card means; and terminal means coupled by transmission lines to a host computer, for exchanging various items of data with the IC card means when the IC card means is inserted in the terminal means. The memory contained in the IC card means also has a status memory area for storing the data showing whether every transaction has been made in an on-line mode or an off-line mode. The IC card means further contains detector means for detecting, from the data stored in the status emory area, whether or not the data read out from the memory is on-line transaction data.

BRIEF DESCRIPTION OF THE DRAWINGS

For a better understanding of the present invention, reference is made of the following description in conjunction with the accompanying drawings, in which:

FIGS. 1A and 1B show, in combination, a block diagram representing the electronic circuit of the card terminal used in a first embodiment of the present invention;

FIG. 3 is a diagram illustrating the structure of the storage memory included in the circuit shown in FIG. 2;

FIG. 4 schematically shows the transaction zone of the storage memory;

FIG. 5 is a flow chart explaining the operation which the first embodiment performs when an on-line transaction is made;

FIGS. 6A and 6B are together a flow chart explaining the operation which the first embodiment performs when an off-line transaction is made.

DETAILED DESCRIPTION OF THE PREFERRED EMBODIMENTS

A first embodiment of the present invention will be described with reference to the drawings attached hereto.

Figure 1A:
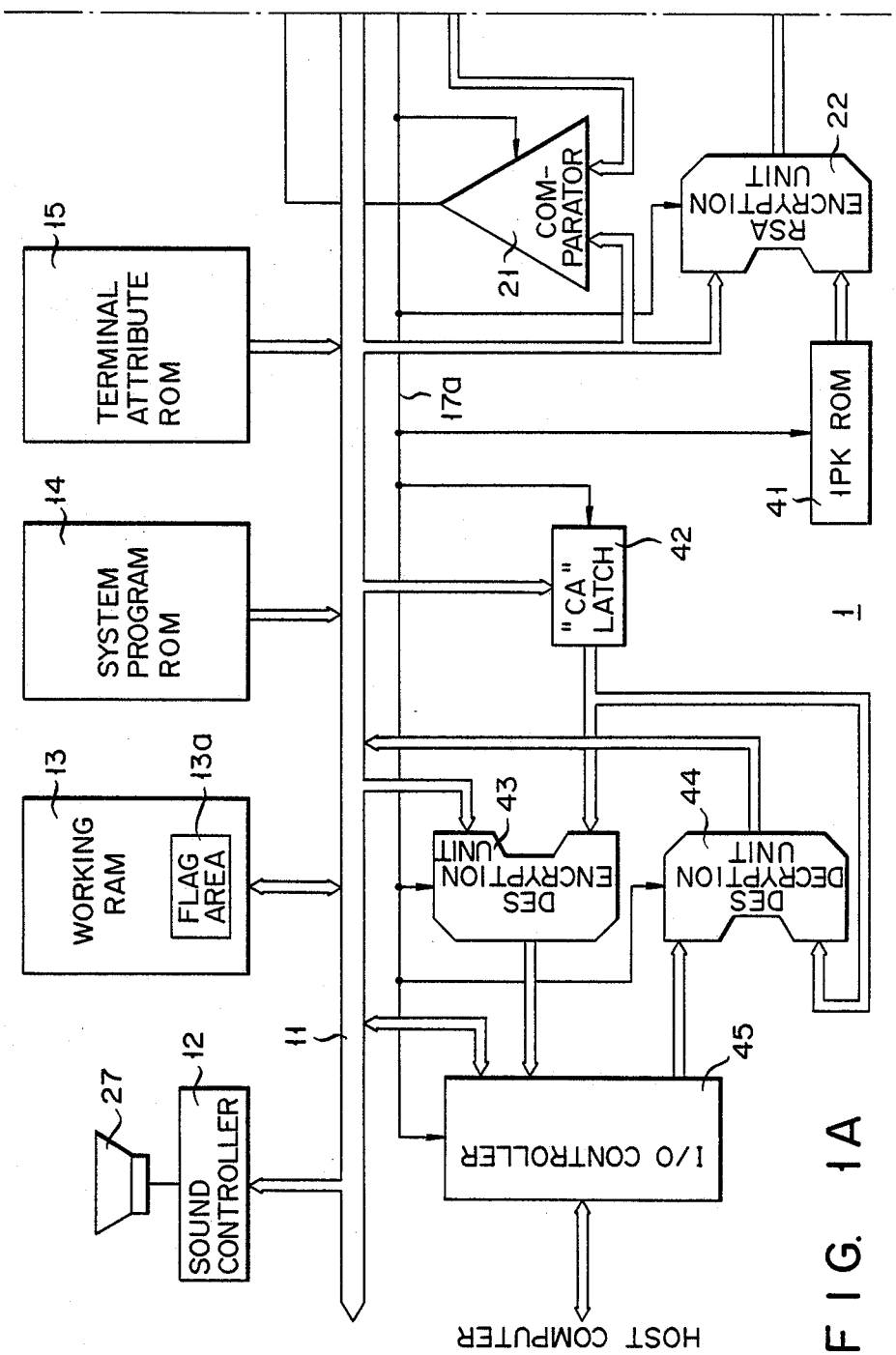

FIGS. 1A and 1B show the circuit of a card terminal 1 in which an IC card 5 (FIG. 2) can be inserted. As is shown in this figure, the card terminal comprises system bus 11. Sound controller 12, working RAM 13, system program ROM 14, terminal attribute ROM 15, and initial parameter RAM 16 are connected to system bus 11. Further, main controller 17, display drive controller 18, key controller 19, and reader/writer controller 20 are also connected to system bus 11. Comparator 21, RSA encryption unit 22, output controller 23, input buffer 25, latch circuit 42, DES encryption unit 43, DES decryption unit 44, and I/O (input/output) controller 45 are also connected to system bus 11. RSA encryption unit 22 encrypts input data in accordance with the RSA algorithm. Latch circuit 42 latches a CA code (later described). Output buffer 24 is connected to output buffer 25. DES encryption unit 43 converts input data into DES (Data Encryption Standard) codes, and DES decryption unit 45 decrypts DES codes.

Speaker 27 is coupled to sound controller 12, and generates an alarm when necessary.

Working RAM 13 has a memory area for storing various items of data, such as PAN, CHN, and EPD, transferred from the IC card inserted in the card terminal, and also for storing other items of data which will be processed within card terminal 1. Working RAM 13 further includes a flag area 13a for storing a flag representing on-line or off-line transaction.

System program ROM 14 stores various system programs. It also stores an ENQ code for permitting communication between card terminal 1 and IC card 5.

Terminal attribute ROM 15 stores terminal code TC specifying the use of card terminal 1. For instance, code TC is a manufacturer code, an issuer code, or a merchant code. The manufacture code indicates that card terminal 1 is used by the card manufacturer. The issuer code represents that card terminal 1 is used by the card issuer. And the merchant code shows that the card terminal is used by the merchant.

Initial parameter RAM 16 is used to store the answer-to-reset data transferred from IC card 5. Output controller 23, input controller 26, Vpp level latch 28, Vpp timer latch 29 and Ipp level latch 30 are connected to initial parameter RAM 16 by data-transmitting line 16a. Vpp power supply 31 is connected to Vpp level latch 28. Vpp timer 32 is connected to Vpp timer latch 29. Ipp limiter 33 is connected to Ipp level latch 30.

Vpp power supply 31 provides voltage Vpp for writing data into the data memory built in the IC card. Vpp timer 32 is used to determine the maximum time for applying voltage Vpp to IC card 5 in order to write one unit of data into the data memory. This maximum time is designated by IC card 5. Ipp limiter 33 determines the maximum value of the current for writing data into the data memory of IC card 5.

The maximum data-writing voltage applied from Vpp power source 31, the maximum time for applying Vpp voltage, which is measured by Vpp timer 32, and the maximum data-writing current, which is determined by Ipp limiter 33, are set in accordance with the answer-to-reset data stored in initial parameter RAM 16.

Selector 34 for selecting an operation frequency for the IC card is connected to data-transmitting line 16a. The output signal of oscillator 35 is supplied to frequency divider 36. Frequency divider 36 divides the frequency of the output signal from oscillator 35, thereby outputting signals of different frequencies. Selector 34 selects one of these output signals of frequency divider 36, and output it from terminal Clock.

Comparator 21, IPK (Issuer's Public Key) ROM 41, latch circuit 42, DES encryption unit 3, DES decryption unit 44, I/O controller 45, and the like, are connected to main controller 17 by system control line 17a. In accordance with the operating condition of the other components, main controller 17 supplies control signals to these components of the IC card system.

Display drive controller 18 is used to control display 3 of card terminal 1.

Key controller 19 supplies key-sampling signals to the keyboard 2 of card terminal 1, thereby to detect any key operation of keyboard 2.

Reader/writer controller 20 controls reader/writer mechanism 38. Mechanism 38 has an electric motor for moving IC card 5 from the card inlet port of card terminal 1 to a predetermined position there within, and for electrically coupling IC card to terminal 1. When the required operations relating to IC card 5 are completed, reader/writer mechanism 38 moves IC card 5 from the aforementioned position, back to the card inlet port.

Output buffer 24, reset controller 39, Ipp level latch 30, selector 34, Vcc power supply 40 are connected reader/writer mechanism 38. An I/O terminal is coupled to output buffer 24. A reset terminal is connected to reset controller 39. A Vpp terminal is coupled to Ipp limiter 33. Terminal Clock is connected to selector 34. A Vcc terminal is coupled to Vcc power supply 40.

Input controller 26 and output controller 23 control the exchange of data between card terminal 1 and IC card 5, in accordance with the instructions supplied from main controller 17 via initial parameter 16. Input controller 26 receives the data transferred from IC card 5, and supplies this data to working RAM 13 and also to comparator 21 via input buffer 25. The output data of comparator 21 is supplied to main controller 17. Output controller 23 receives the data supplied from terminal attribute ROM 15, and supplies this data to IC card 5 via output buffer 24.

RSA encryption unit 22 is designed to encrypt data PAN, supplied from working RAM 13 via system bus 11, by using the public key code read out from IPK ROM 41. IPK ROM 41 stores the public key code associated with the decryption code PRK stored in the data memory of IC card 5. ROM 41 outputs the public key code upon receipt of an instruction from main controller 17.

Latch circuit 42 latches a CA code, and supplies this code to DES encryption unit 43 and DES decryption unit 44. Prescribed data is input to DES encryption unit 43 via system bus 11. More specifically, data PAN stored in working RAM 13 is input to DES encryption unit 43. DES encryption unit 43 encrypts PAN by using code CA as a key code. DES decryption unit 44 decrypts the encrypted data input to I/O controller from DES encryption unit 43, by using CA as a key code, and outputs the decrypted data to system bus 11.

I/O controller 45 is used to exchange encrypted data between card terminal 1 and the host computer installed in the card issuer, i.e., the credit company or the bank. Card terminal 1 is connected to this host computer in on-line fashion.

IC card 5 contains an electronic circuit. This electronic circuit will now be described with reference to FIG. 2. As is shown in this figure, the circuit comprises system bus 51. Answer-to-reset data ROM 52, application ROM 53, test program ROM 54, system program ROM 55, working RAM 56, central controller 57, and read/write controller 58 are connected to system bus 51. Further decryptor 59, input buffer 60 and output controller 62 are connected system bus 51. Input controller 61 is coupled to input buffer 60, and output buffer 63 is coupled to output controller 62. Data input-/output terminal I/O is connected to input controller 61 and output buffer 63.

Answer-to-reset data ROM 52 stores data representing various conditions for operating IC card 5, such as the data-writing voltage, maximum data-writing current, maximum time for applying the data-writing voltage, maximum amount of data to transmit, and maximum response-waiting time. This data, called "answer-to-data", is transferred in a prescribed format to card terminal 1, upon completion of the initialization of IC card 5.

Application ROM 53 stores data APN (Application Name) specifying the use of IC card 5. Data APN is transferred in a prescribed format to card terminal 1, in order to achieve the exchange of attributes between card terminal 1 and IC card 5, after the initial parameters have been set in initial parameter RAM 16 of card terminal 1 in accordance with the answer-to-reset data. The answer-to-reset data, and the protocol for the exchange of attributes are explained in detail in U.S. patent applications Ser. Nos. 884,279 and 884,280 filed on July 10, 1986 by the applicants hereof.

Test program ROM 54 stores a program which is executed, whenever necessary, to test IC card 5.

System program ROM 55 stores an ACK code and a NAC code, as well as various system programs. The ACK code shows that the signal transmitted from card terminal 1 is correct. The NAC code indicates that the signal transmitted from card terminal 1 is incorrect.

Working RAM 56 is used to store various items of data to be processed within IC card 5. It has register (C) 561 for counting consecutive uses of the IC card in the off-line mode.

Central controller 57 generates instructions in accordance with the signals supplied from input buffer 60 and representing the receipt of input data to IC card 5, and also in accordance with the operating conditions of the other components of IC card 5. These instructions are supplied to the other components of the IC card. Further, controller 57 increments the count value of register 561 by one, clear this register 561, and determines the count value of register 561.

Read/write controller 58 is designed to control the writing of data to, and the reading of data from, storage memory 64, in accordance with the instructions sent from central controller 57. The data read out from memory 64.

As is shown in FIG. 3, storage memory 64 has zone-address table 641, public zone 642, secret zone 643, transaction zone 644, and credit zone 645. Zone-address table 641 is provided to store a prescribed zone address. The data stored at the zone address is compared with the test data, thereby to determine whether IC card 5 is valid or invalid. Public zone 642 is used to store public data. Secret zone 643 is used to store various items of data, such as PIN (Personal Identification Number), RTN (Re-Try Number), IPIN (Initialization Personal Identification Number), PAN (Primary Account Number,, PRK (Private Key Code), and the maximum amount of transaction. Since the maximum amount of transaction is fixed, and the maximum number of times the IC card can be used is also fixed as will be explained later, the total amount for which IC card 5 can be used is limited. Further, the secret data about the holder of IC card 5 is stored in secret zone 643. Transaction zone 644 includes transaction data areas 644a, 644b, 644c . . . provided to store two-byte year/month data showing the year and month of a transaction, one-byte data items representing "Data being sent in on-line fashion, though card is used in off-line mode", "The customer checked the particulars of transaction", "On-line, Off-line transaction", one-byte data showing the present data, one-byte data specifying the type of the transaction, one-byte SIC data representing the code of the enterprise with which the card holder has made the transaction, one-byte TAN data showing the number of the terminal application card used in card terminal 1, one-byte currency unit data specifying the currency unit in which the transaction has been made, six-byte amount data showing the amount of the transaction, two-byte TAC data representing the number of the transaction, and six-byte balance data representing the balance of the card holder's account. Credit zone 245 is used to store various items of data concerning credit sales.

Figure 2:
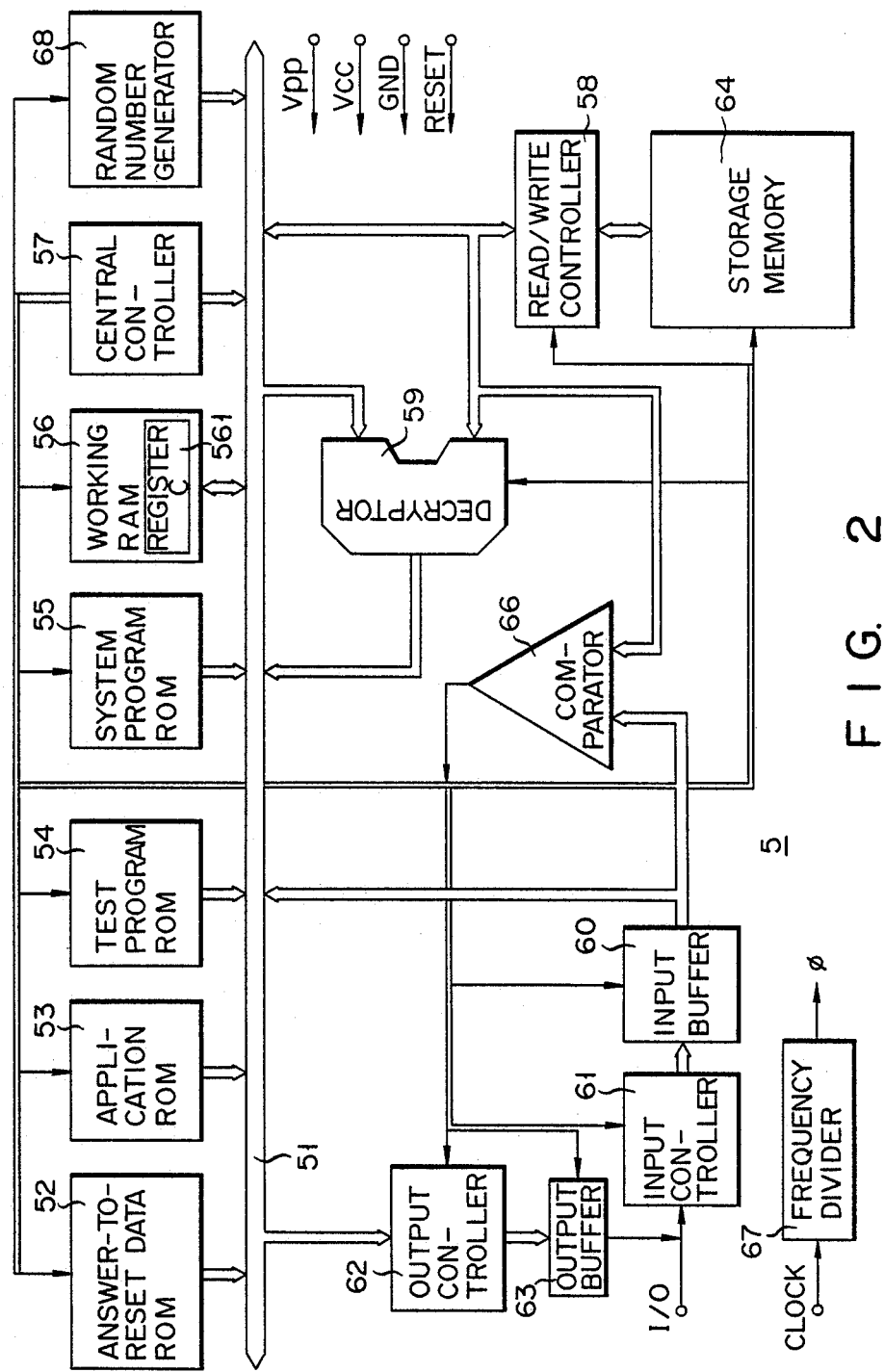
FIG. 2 is a block diagram showing the electronic circuit provided within the IC card used in the first embodiment of the invention.

As is shown in FIG. 2, IC card includes random number generator 68. This generator generates a random number in response to an instruction given by central controller 57.

Decryptor 59 is designed to decrypt input encrypted data in accordance with a prescribed algorithm. More specifically, it decrypts the data input from terminal 1 through input buffer 60, by using the PRK code read out from storage memory 64.

The data read by read/write controller 58 from storage memory 64 is supplied to one input terminal of comparator 66. The input data decrypted by decryptor 59, the data stored in working RAM 56, and the specific code stored in data ROM 52 can be supplied to the other input terminal of this comparator 66. Comparator 66 compares the two input data pieces. The output data of comparator 66, which represents the results of this comparison, is supplied to central controller 57.

Hence, when IC card 5 is inserted in card terminal 1, terminal 1 supplies reset signal Reset, system clock signal Clock to card 5. At the same time, Vpp power supply 31 and Vcc power supply 40 are connected, both provided in terminal 1, are connected to IC card 5. Vcc power supply 40 is used to drive the system, whereas Vpp power supply 31 provide power for writing data into storage memory 64 of card 5. The voltage applied from Vpp power supply 31 is set in terminal 1 on the basis of the answer-to-reset data stored in data ROM 52. Vcc power supply 31 supplies a system drive signal to frequency divider 67 provided in IC card 5 through terminal Clock of IC card 5.

The operation of the embodiment described above will now be explained. First, it will be explained how the IC card system operates when the card holder makes an on-line transaction by using his or her IC card 5.

When the card holder inserts his or her IC card 5 into card terminal 1, card terminal 1 supplies an initialization signal to IC card 5. IC card 5 is then reset in the operating conditions represented by the initialization signal. Then, the answer-to-reset data is read out from data ROM 52 under the control of central controller 57, and is transferred from IC card 5, via output buffer 63 and terminal I/O, to card terminal 1.

IC card terminal 1, the answer-to-reset data is written into initial parameter RAM 16 via input controller 26 and input buffer 25. Main controller 17 determines whether or not the answer-to-reset data can be processed by card terminal 1. If main controller 17 determines that this data can be processed by terminal 1, main controller 17 sets the data-writing voltage, the maximum time for applying the data-writing voltage, the maximum data-writing current, and the operation frequency of IC card 5 at the values designated by the answer-to-reset data. Then, main controller 17 reads the ENQ code from system program ROM 14. The ENQ code is transmitted to IC card 5 via output controller 23 and output buffer 24.

In IC card 5, the ENQ code is written into working RAM 56. Central controller 57 determined whether or not the ENQ code is correct. If the ENQ code is found to be correct, the ACK code is read from system program ROM 55. If the ENQ code is found to be incorrect, the NAC code is read from ROM 55. Assume the ACK code is read out from ROM 55. The ACK code is transmitted to card terminal 1 via output controller 62 and output buffer 63. The ACK code is then written into working RAM 13. Then, main controller 17 reads terminal code TC from terminal attribute ROM 15. Terminal code TC, which specifies the type of card terminal 1, is latched in output buffer 24. Let us assume that the NAC code is read out from system program ROM 55. In this case, IC card 5 is disconnected from reader/writer mechanism 38.

Thereafter, terminal code TC is transferred from output buffer 24 to IC card 5. In IC card 5, data APN (Application Name), which specifies the use of IC card 5, is read out from application ROM 53. Data APN is temporarily stored in output buffer 63, and subsequently transferred to card terminal 1. In card terminal 1, data APN is stored into working RAM 13. Main controller 17 reads data APN from RAM 13 and determines whether or not data APN is identical to data APN stored in terminal attribute ROM 15. If the input data APN is found identical to data APN stored in ROM 15, thus ascertaining that IC card 5 can be used in combination with card terminal 1. An instruction code is read out from system program ROM 14 and supplied to IC card 5. On the other hand, if the input data APN is found not identical to data APN stored in ROM 15, IC card 5 is disconnected from reader/writer mechanism 38.

Once the instruction code has been supplied to IC card 5, the card holder can input his or her PIN (Personal Identification Number) by operating keyboard 2 of card terminal 1. When the card holder operates keyboard 2, thereby inputting his or her PIN, data PIN is supplied from card terminal 1 to the data input/output terminal I/O of IC card 5. Data PIN is supplied through input controller 61 and input buffer 60 and written into working RAM 56. Data PIN is then input to comparator 66.

Main controller 17 determines whether the on-line flag in the area 13a of working RAM 13 is set or not. If the flag is set, thus indicating that IC card 5 can be used in making an on-line transaction. With reference to the flow chart of FIG. 5, it will be explained how an on-line transaction is performed by using IC card 5 inserted in card terminal 1. When main controller 17 determines that the on-line flag is set in area 13a of working RAM 13, the operation goes to step A1. In step A1, central controller 57 detects that data PIN has been input to IC card 5, read/write controller 58 reads out data R-PIN (Registered PIN) from secret zone 643 of storage memory 64, and data R-PIN is input to comparator 66. Comparator 66 compares data R-PIN with data E-PIN (Entered PIN) which has been input to comparator 66 from card terminal 1. Let us assume that data E-PIN and data R-PIN are identical, whereby the card holder is identified as the authenticated one. Also in step A1, a specific code is sent from IC card 5 to card terminal 1. In terminal 1, RSA encryption unit 22 encrypts the specific code, by using the IPK (Issuer's Public Key) code. The encrypted specific code is sent to IC card 5. In IC card 5, the encrypted specific code is decrypted by decryptor 59, by using the PRK (Private Key) code stored in storage memory 64. Comparator 66 compares the decrypted code with the original specific code. If the decrypted code is identical to the original specific code, it is ascertained that IC card 5 can be used in combination with card terminal 1 to perform an on-line transaction.

Then, the operation goes to the next step A2. In step A2, the transaction data, which the card holder has input by operating keyboard 2 of terminal 1, is transferred to IC card 5 through output controller 23 and output buffer 24. In IC card 5, the transaction data is supplied to working RAM 56 via input buffer 63 and input controller 62, and subsequently written into working RAM 56.

The operation goes to step A3. In step A3, central controller 57 causes read/write controller 58 to search memory 64 for transaction area 644a of transaction zone 644, more precisely area #Ti in which the data about the previous transaction should be stored, if any. Then, in step A4, it is determined whether or not data is stored in transaction area #Ti. If YES, the operation advances to the next step, A5. In step A5, it is determined whether or not the data has been used in making an online transaction, in accordance with "status data." If NO, the operation goes to step A6. In step A6, the data stored in transaction area #Ti is written into working RAM 56, and is transferred to card terminal 1 through output controller 62 and output buffer 63. In card terminal 1, the transaction data is supplied to working RAM 13 via input controller 26 and input buffer 25 and written into working RAM 13. The data is read from RAM 13 and encrypted by DES encryption unit 43. The encrypted transaction data is transferred to the host computer installed in the credit company, the bank, or the like, through I/O controller 45.

Next, the operation goes to step A7. In this step, central controller 58 causes read/write controller 58 to search for transaction area $\#T_{i-1}$ of storage memory 64. When area $\#T_{i-1}$ is found, the operation returns to step A4. In step A4, it is determined whether or not data is stored in transaction area #T$_{i-1}$. If YES, it is determined, in step A5, whether or not the transaction data stored in area #T$_{i-1}$ has been used in making an on-line transaction. If NO in step A5, the operation advances to step A6, in which the transaction data is encrypted and then transferred from terminal 1 to the host computer. As long as the decision made in step A5, is NO, steps A6, A7, and A4 are repeated in this order, whereby the data items used in other off-line transactions are transferred from card terminal 1 to the host computer, one after another.

When the decision made in step A4 is NO, that is, when it is determined that no data is stored in any transaction area of storage memory 64, or when the decision made in step A5 is YES, that is, when an on-line transaction data is found in transaction area #Ti, the operation advances to step A8. In step A8, the data about the present transaction is written in transaction area #T$_{i+1}$. Then, in step A9, the present transaction data written in area #T$_{i+1}$ is stored in working ROM 56 and is also transferred to card terminal 1 via output controller 62 and output buffer 63. In card terminal 1, the present transaction data is supplied via input controller 26 and input buffer to working RAM 13, and is thus written thereinto. This data is read out from working RAM 13, encrypted by DES encryption unit 43, and transferred to the host computer through I/O controller 45. Thus, the on-line transaction is completed.

Hence, every time the card holder makes an on-line transaction by using his or her IC card 5, card 5 is checked to ascertain as to whether or not any off-line transaction data remains in storage memory 64, uncollected in the credit company, the bank, or the like. If off-line transaction data remains uncollected, this data is immediately read out and transferred to the host computer installed in the credit company, the bank, or the like. The off-line transaction data can, therefore, be collected relatively soon after the off-line transaction has been made. Hence, the balance of the card holder's account, the credit data, and other data stored in IC card 5 can be updated sooner than can be updated in the conventional IC card system. The fraudulent use of IC card 5 can, therefore, be detected soon. The IC card system of the present invention can thus help to control fraudulent use of IC card 5, and hence to increase the security of IC card 5.

Figure 6A:
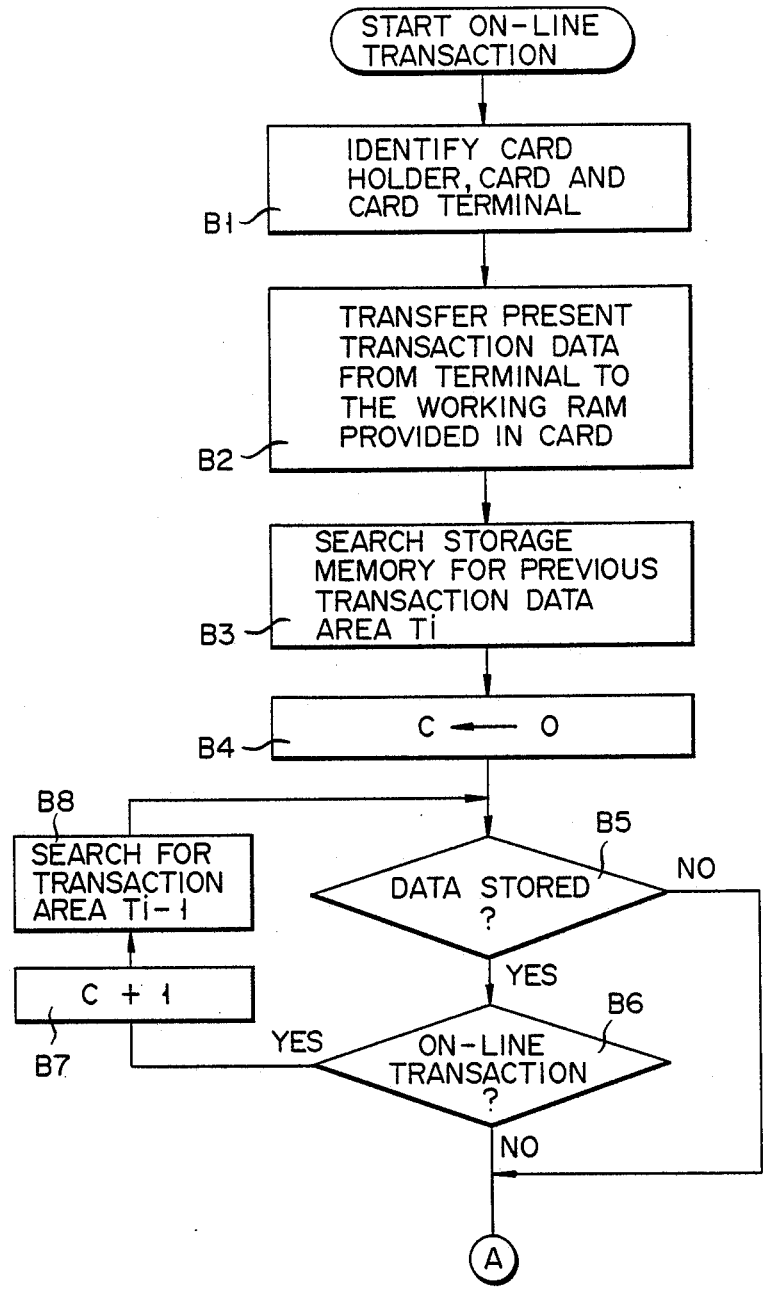

Now, it will be explained how the IC card system operates when the card holder makes an off-line transaction, by using his or her IC card 5, referring to the flow chart of FIGS. 6A and 6B.

When the card holder inserts IC card 5 into card terminal 1, IC card 5 is reset, the answer-to-reset data is written into RAM 16 of card terminal 1, and the attribute exchange is performed between terminal 1 and card 5, as has been described above, thereby making it possible to transfer data from terminal 1 to card 5, and vice versa. Thereafter, steps B1, B2, and B3, which are the same as steps A1, A2, and A3 shown in FIG. 5, are carried out.

After that transaction area of transaction zone 644 of storage memory 64, in which the previous transaction data should be stored, has been found in step B3, the operation advances to step B4. In step B4, register 561 of working RAM 56 is cleared, thus changing the count value of counter 561 to "0". In the next step, B5, it is determined whether or not data is stored in the transaction area found in step B3, i.e., transaction area #Ti. If YES, the operation goes to step B6. In step B6, it is determined whether or not the data has been used in making an off-line transaction, in accordance with "status data." If YES, the operation goes to step B7, in which central controller 57 increments the count value of register 561 of working RAM 56. Then, in step B8, central controller 58 causes read/write controller 58 to search storage memory 64 for transaction area #T$_{i-1}$, which immediately precedes transaction area #Ti. When area #T$_{i-1}$ is found, the operation returns to step B5. Hence, it is determined whether or not data is stored in transaction area #T$_{i-1}$. If YES, steps B6, B7, B8, and B5 are repeated in this order until a NO decision is given in step B5.

If the decision made in step B5 is NO, that is, when no data is stored in the transaction area which has been found in step B3, or if the decision made in step B6 is NO, that is, when the data stored in the transaction area has been used in making an off-line transaction, the operation then goes to step B9. In step B9, it is determined how many off-line transactions have been continuously made by using IC card 5. In this embodiment, four off-line transactions, or less, can be continuously performed. Hence, an off-line transaction can be carried out as long as the count value of register 561 remains less than "5". Hence, in step B9 it is determined whether or not the count value of register 561 is less than "5". If YES, the operation jumps to step B10, in which the data of the present transaction is written in area #T$_{i+1}$. Thus, the off-line transaction is completed.

If NO in step B9, that is, when the count value of register 561 is found to be greater than "4", the operation goes to step B11. In this step, it is determined how many off-line transactions have been continuously carried out. In this instance, 5 to 18 off-line transactions can be continuously performed. Therefore, in step B11 it is determined whether or not the count value of register 561 is "5" to "18". If YES in step B11, the operation advances to step B12.

In step B12, central controller 57 causes random number generator 68 to generate a random number, and the random number is compared with a plurality of numerical values n. Values n are such that each can be identical to the random number with a specified probability. Values n are stored in, for example, system program ROM 55.

If YES in step B12, the operation goes to step B10, in which the present transaction data is written in area #T$_{i+1}$ of transaction zone 644 of storage memory 64, in the same way as has been explained above. Thus, the off-line transaction is completed.

On the other hand, if NO in step B12, that is, when the random number generated by random number generator 68 is not identical to any specified numerical value n, the operation goes to step B13. In this step, a "transaction impossible" signal is supplied via output controller 62 and output buffer 63 to card terminal 1. In card terminal 1, this signal is supplied via input controller 26 and input buffer 25 to working RAM 13, and subsequently written into this RAM 13. At the same time, main controller 17 responds to this signal, and causes display drive controller 18 to drive display 3. Display 3 displays a message "TRANSACTION IMPOSSIBLE ON TERMINAL." Then, in step B14, IC card 5 is ejected from card terminal 1.

If the decision made in step B11 is NO, that is, when it is determined that more than 18 off-line transactions have been continuously carried out by using IC card 5, the operation unconditionally goes to step B13. Hence, display 3 displays the message "TRANSACTION IMPOSSIBLE ON TERMINAL", and in step B14, IC card 5 is ejected from card terminal 1.

When it is determined, in step B11, that more than 18 off-line transactions have been continuously performed, the data showing this fact can be written, along with the present transaction data, in area $\#T_{i+1}$ of transaction zone 644 of storage memory 64, and a message "NO FURTHER OFF-LINE TRANSACTION POSSIBLE" can be displayed by display 3, before IC card 5 is ejected form card terminal 1.

In the embodiment, the decisions made in steps B9 and B11 are YES when the count value of register 561 is not more than "4" and is from 5 to 18, respectively. Instead, these decisions can be YES when the count value of register 561 is not more than a value different from "4" and within a different range.

As has been explained, at most four off-line transactions can be continuously carried out unconditionally, by using IC card 5. Further, at most 5 to 18 off-line transactions can be continuously performed by using IC card 5, but it remains unknown to anybody how many off-line transactions have been made within this specific range. Therefore, fraudulent use of IC card for off-line transactions can be controlled or suppressed, and the security of IC card 5 against fraudulent off-line transactions can be increased.

As has been described above, the number of times the card holder can perform off-line transaction by using IC card 5 is limited, and this number of times is known to only the card holder. Further, the maximum amount of an off-line transaction is limited to a specific value which remains unknown to any person other than the card holder. Therefore, any other person, who has obtained the IC card either by chance or by theft, but does not know how many times the card can be used in the off-line mode or how much he or she can by each off-line transaction, is discouraged to use IC card 5. The illegal user cannot use the card to make as many off-line transactions as he or she wishes. Hence, the IC card system helps to reduce illegal uses of IC cards.

Figure 7:
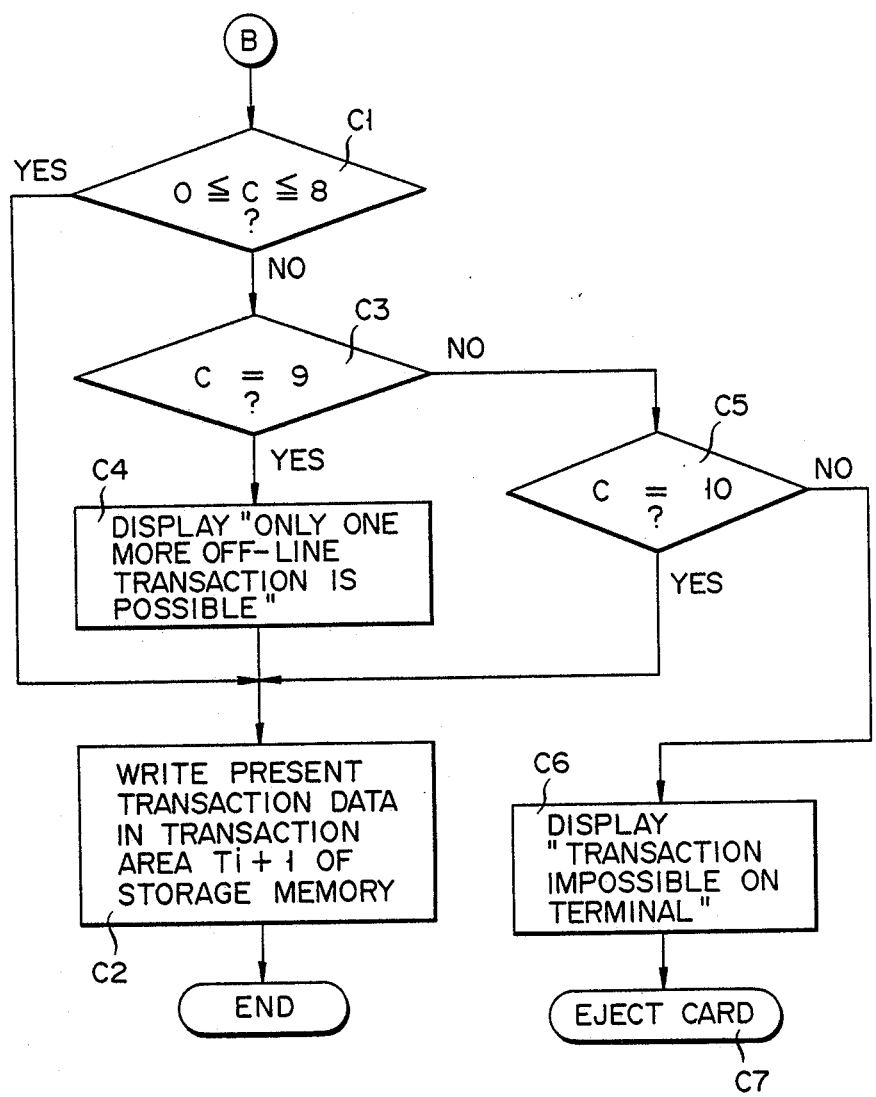
FIG. 7 is a flow chart explaining the operation which a second embodiment of this invention performs when an off-line transaction is made.

In the embodiment described above, at most four off-line transactions can be continuously performed by using IC, on no conditions, and five to 18 off-line transactions can also be continuously carried out, provided that the random number generated by random number generator 68 is identical to one of specified numerical values n. According to the present invention, an alarm can be given to the card user when the last off-line transaction but one is performed, or when the first of the last few off-line transactions is carried out. The operation of a second embodiment according to the invention, wherein such an alarm can be given, will be explained with reference to the flow chart of FIG. 7.

In the IC card system of the second embodiment, steps B1 to B6 are executed in the same way as in the first embodiment. If NO in step B5 or step B6, the operation goes to step C1 shown in FIG. 7. In step C1, it is determined whether or not eight or less off-line transactions have been continuously made by using IC card 5. This is because, in this embodiment, at most ten off-line transactions can be continuously carried out, and an alarm is given to the card user when he or she uses IC card 5 for the ninth of the ten consecutive off-line transactions. In other words, at most ten off-line transactions can be continuously performed on no conditions. If YES in step C1, the operation goes to step C2. In step C2, the present transaction data is written in area $\#T_{i+1}$ of transaction zone 644 of storage memory 64. Thus, the off-line transaction is completed.

On the other hand, if NO in step C1, that is, if it is determined that the count value of register 561 of working RAM 56 is greater than "8", the operation advances to step C3. In this step, it is determined whether or not the count value of register 561 is "9". If YES, the operation goes to step C4. In step C4, a signal showing that only one more off-line transaction can be performed, is supplied from IC card 5 to card terminal 1 via output buffer 62 and output controller 63 of card 5. In card terminal 1, this signal is supplied to working RAM 13 via input controller 26 and input buffer 25, and is subsequently written into working RAM 13. Main controller 17 causes display drive controller 18 to drive display 3. Display 3 thus displays a message "ONLY ONE MORE OFF-LINE TRANSACTION IS POSSIBLE." The card user can, therefore, know that he or she can make only one more off-line transaction by using IC card 5. Then, the operation goes to step C2, in which the present transaction data is written in area $\#T_{i+1}$ of transaction zone 64. Thus, the ninth consecutive off-line transaction is completed.

If the decision made in step C3 is NO, that is, if the count value of register 561 is not "9", the operation goes to step C5. In this step, it is determined whether the count value of register 561 is "10". If YES, the operation goes to step C2, the data about the tenth consecutive off-line transaction is written in area $\#T_{i+1}$ of transaction zone 644 of storage memory 64. Thus, the tenth consecutive off-line transaction is completed.

If the decision made in step C5 is NO, that is, if the count value of register 561 is greater than "10", the operation advances to step C6. In step C6, a signal, which shows that any more off-line transaction is impossible on terminal 1, is supplied from IC card 5 to card terminal 1, via output buffer 63 and output controller 62 of card 5. In card terminal 1, this signal is supplied to working RAM 13 via input controller 26 and input buffer 25, and is subsequently written into working RAM 13. At the same time, main controller 17 causes display drive controller 18 to drive display 3. Display 3 therefore displays a message "TRANSACTION IMPOSSIBLE ON TERMINAL." Then, in step C7, IC card 5 is ejected from card terminal 1.

As has been explained, in the IC card system of the second embodiment, at most ten off-line transactions can be continuously executed by using IC card 5, and when the ninth consecutive off-line transaction is performed, displays the message "TRANSACTION IMPOSSIBLE ON TERMINAL." Therefore, the card user can know he or she can use IC card 5 to make only another off-line transaction. So the card user need not be annoyed to find his or her IC card can no longer be used for off-line transactions, after he or she selected goods to buy in a shop. Hence, the IC card system of the second embodiment is convenient to card users, particularly when they use their cards in the off-line mode.

In the second embodiment, display 3 displays the message "TRANSACTION IMPOSSIBLE ON TERMINAL" when the card user uses IC card 5 for the last but one of the prescribed number of off-line transactions which can be continuously carried out. Instead, speaker 27 can give an alarm, either in a buzzer sound or in a recorded oral message. Further, an alarm of any type can be given when the first of the last few off-line transactions, which can be executed continuously, is carried out.

As has been described above in detail, according to the present invention, every time an on-line transaction is executed by the user of IC card 5, card 5 is checked to ascertain whether or not any off-line transaction data remains in card 5, uncollected in the credit company, the bank, or the like. If remaining uncollected, the data is immediately read from card 1 and transferred to the host computer installed in the credit company, the bank, or the like, and is thereby collected. Hence, the balance of the card holder's account, the credit data, and the other data stored in IC card 5 can be updated relatively soon after the off-line transaction has been made. The fraudulent use of card 5, if any, can thus be detected soon. Therefore, the security of IC card 5 increases.

Further, since the maximum number of off-line transactions which the card user can continuously carry out by using IC card 5 is determined by a random number generated by random number generator 68 and incidentally identical to one of specified numerical values n, and therefore remains unknown to anybody. Hence, fraudulent use of IC card 5 for off-line transactions can be controlled and suppressed, and the security of IC card 5 against fraudulent off-line transactions can increase.

Moreover, since an alarm can be given, showing the card user that it will soon become impossible for him or her to make off-line transactions by using his or her IC card 5. Therefore, the card user need not be annoyed to find the IC card can no longer be used in the off-line mode, after he or she has selected goods to buy. The IC card system of the present invention can be convenient, particularly when the card users use their IC cards to execute off-line transactions.

What is claimed is:

1. An IC card system comprising:
    IC card means containing an IC chip including a memory means having memory areas for storing items of transaction data about transactions made by using the IC card means; and
    terminal means coupled by transmission lines to a host computer, for exchanging various items of data with said IC card means when said IC card means is inserted in said terminal means and electrically connected thereto, said memory means further having a status memory area for storing status data showing whether every transaction has been made in an on-line mode or an off-line mode, and said IC card means further including detector means for detecting, from the status data stored in said status memory area, whether or not the data read out from said memory means is on-line transaction data.

2. An IC card system according to claim 1, wherein said terminal means includes control means for controlling said IC card mans such that a transaction is made either in an on-line mode or an off-line mode by using said IC card means.

3. An IC card system according to claim 2, wherein said IC card means has data-reading means for reading data about any previous off-line transaction from said memory in accordance with the results of the detection performed by said detector means, when the transaction being made by using said IC card means is an on-line transaction; and said terminal means has data-transferring means for transferring the off-line transaction data, read out by said data-reading means, to said host computer.

4. An IC card system according to claim 3, wherein said detector means includes means for detecting items of status data stored in said status memory area, and said data-reading means including means for reading the data about the latest off-line transaction data from said memory means.

5. An IC card system according to claim 2, wherein said IC card means has counter means for counting the off-line transactions, which have been continuously made, in accordance with the results of the detection performed by said detector means, judging means for determining whether or not the count value of said counter means is greater than a first predetermined value, and transaction-prohibiting means for prohibiting any further transaction to be made by using said IC card means, when said judging means determines that the count value of said counter means is greater than said first predetermined value.

6. An IC card system according to claim 5, wherein said IC card means further has random number generating means, and said transaction-prohibiting means includes means for prohibiting the off-line transaction being made by using said IC card means, with probability defined by a random number generated by said random number generating means, when the count value of said counter means is less than the first predetermined value.

7. An IC card system according to claim 6, wherein said judging means includes means for determining whether or not the count value of said counter means is less than a second predetermined value which is smaller than the first predetermined value, and means for allowing unconditionally for the off-line transaction being made by using said IC card means.

8. An IC card system according to claim 5, further comprising alarm means for informing that any further transaction is impossible, when said judging means determines that the count value of said counter means has reached a third predetermined value which is less than said first predetermined value by a prescribed value.

9. An IC card system according to claim 8, wherein said alarm means comprises display means provided in said terminal means.

10. An IC card system according to claim 8, wherein said prescribed value is one.

* * * * *